United States Patent [19]
Dronet

[11] 4,370,118
[45] Jan. 25, 1983

[54] ARRANGEMENT FOR INTRODUCING BANDEROLES OR STRIPS INTO RECEPTACLES

[75] Inventor: Jean-Marc Dronet, Falaise, France

[73] Assignee: Societe d'Application Plastique Mecanique et Electronique, Falaise, France

[21] Appl. No.: 265,101

[22] Filed: May 19, 1981

[30] Foreign Application Priority Data

May 19, 1980 [FR] France .................. 80 11090

[51] Int. Cl.³ .................................................. B29C 17/00
[52] U.S. Cl. ........................... 425/305.1; 425/388; 425/397
[58] Field of Search ............... 425/388, 305.1, 397

[56] References Cited

U.S. PATENT DOCUMENTS

| | | | |
|---|---|---|---|
| 3,661,489 | 5/1972 | Moore | 425/388 X |
| 3,709,643 | 1/1973 | Nasica | 425/308 X |
| 4,021,286 | 5/1977 | Amberg | 425/388 X |
| 4,059,377 | 11/1977 | Corbic | 425/305.1 |
| 4,086,045 | 4/1978 | Thiel et al. | 425/388 X |
| 4,150,936 | 4/1979 | Shioi et al. | 425/397 |
| 4,242,293 | 12/1980 | Dowd | 425/305.1 X |

Primary Examiner—J. Howard Flint, Jr.

[57] ABSTRACT

An arrangement for introducing banderoles into receptacles by means of suction mandrels which are mounted in a plurality of members having guide passages. The suction mandrels are slidably mounted in the members which are disposed along two parallel lines. Cut banderoles are fed into the guide passages of the plurality of members from the same side. The banderoles are cut by knives and fed by pairs of feed rollers which knives and feed rollers are mounted in blocks. The distance between the cutting edge of a knife and inlet generatrix of a guide passage is slightly less than the length of a cut banderole. The suction mandrel has two suction zones. The first zone is coupled with a source of vacuum during rotation of the mandrel subsequent to the cutting of the banderole until complete looping thereof, as well as during transfer of the looped banderole into the mold; the second zone is coupled with a source of vacuum only at the end of rotation of the mandrel and during said transfer to the mold.

8 Claims, 7 Drawing Figures

ARRANGEMENT FOR INTRODUCING BANDEROLES OR STRIPS INTO RECEPTACLES

BACKGROUND OF THE INVENTION

The present invention relates to an arrangement for feeding banderoles into receptacles of the type described in German Pat. No. 568,834.

In the arrangement of the type disclosed in the aforesaid German patent, a banderole is set and rolled into a loop in a member furnished with an inlet slit, by means of wheels or runners; thereafter it is cut by knives and transferred into the receptacle by means of a suction mandrel. When the knives are not mounted in the walls of the member in which the guide passage for the mandrel is disposed, the suction mandrel is also used for rotation, in order to introduce the banderole into the member, in order to effectuate its looping around the mandrel.

In machines for heat-forming receptacles, such an arrangement may be used for introducing the suction mandrels into the molds prior to heat-forming the receptacles themselves, for example, such as is disclosed in the French Pat. No. 74.42973 published under No. 2.256.014 and No. 77.03132 published under No. 2.340.185.

It is also possible to utilize such an arrangement for introducing suction mandrels into the receptacles after heat-forming, as is the case when fabricating receptacles for small portions of soft cheese and the like.

The improvement in accordance with the invention is described in connection with a machine for heat-forming receptacles having external banderoles, as is described in the afore-mentioned French patents without other applications being excluded for such machines. Such machines are designed to produce from a band of thermoplastic material, at high production cadences, pots or receptacles of different shapes and to provide such pots or receptacles with laterally affixed banderoles or strips. To achieve this, the machine is provided, in addition to the conventional forming stations, filling stations, the station for positioning a lid, closing of the receptacle and the sealing thereof, the cutting of the individual parts and receptacles, with means for introducing the banderole or strip into the mold prior to the proper heat-forming operation.

In order to obtain the high production cadence with a minimum of waste of sheets of thermoplastic material, the molds are grouped closely together, side by side along a line, which is transverse to the direction of payout of the thermoplastic band, each band being associated with a member identically disposed, and the introduction of the banderoles or strips into members including the suction mandrels is carried out simultaneously into all members which are aligned, at one side of these aligned members. The banderoles are thereafter transferred simultaneously into the corresponding aligned molds. If one places two lines of molds side by side, it is possible to introduce the banderoles into each side of the assembly so formed; it is therefore possible to place simultaneously the banderoles into 8 or 12 molds at each advancing step of the thermoplastic sheet, the introducing or feed rollers, the knives and the transfer mandrels all operating synchronously.

SUMMARY OF THE INVENTION

The present invention has an object to improve the aforedescribed arrangement to thereby double the production cadence of such a machine without increasing the width of the band of the thermoplastic sheet.

The mechanism for introducing the banderoles in accordance with the invention is characterized in that it includes members for looping the banderoles, which members are organized into groups aligned along two parallel lines, and to which the banderoles are fed from the same side; the transverse cutting knives being disposed in as many groups of two parallel lines; the distance between the cutting ridge of a knife and the generatrix of the inlet slit of the member having the corresponding guide passage being slightly less than the length of one banderole; and the mandrel having two suction zones, the first leading into the portion of the mandrel which faces the end of the banderole which is introduced into the guide passage at the moment of the cutting action, which first zone is coupled to a vacuum source during the rotation of the mandrel following the action of the knives until the looping of the banderole is complete as well as during the transfer of the banderoles into the molds; the second zone leading to the part of the mandrel which faces the other end of banderole at the end of the looping of the banderole by rotation of the mandrel and which is coupled to a vacuum source only at the end of the looping as well as during the transfer.

The expression "miniscule lice" means a difference between the length of the transversely cut banderole and the distance which separates the cutting ridge or edge of one knife and the inlet generatrix of the member having the guide passage, which difference is larger than about 1 cm and is preferably smaller than about $\frac{1}{4}$ of the length of the banderole or the periphery of the suction mandrel. Similarly, the second vacuum zone of the mandrel leads preferably into the portion of the mandrel which is occupied by the last quarter of the banderole after looping thereof.

The invention includes also the following features:

(1) The members having the guide passages are disposed along two parallel lines, and each knife is associated with one pair of feeding rollers in a compact feeding and cutting block; the different blocks being disposed at the same side of the line of members having guide passages in two lines of staggered blocks and are separated by guide passages of lengths equal to that of the blocks.

(2) The distance between the cutting ridge or edge of a knife and the inlet generatrix of a member having the guide passage is the same for the two lines of juxtaposed members with guide passages.

(3) In order to be able to place the overlapping ends of banderoles as is desired, the rotation strokes of the suction mandrel of the two juxtaposed lines of suction mandrels may be different.

(4) Each mandrel is constituted by a sleeve which is provided with openings and which turns about a fixed shaft on which annular grooves are disposed with respect to the openings of the first suction zone, and cutout sectors are disposed which cooperate with the openings of the second suction zone, the grooves and cutout sectors being connected to a vacuum source by an internal conduit passing through said fixed shaft.

BRIEF DESCRIPTION OF THE DRAWINGS

With these and other objects in view, which will become apparent in the following detailed description, the present invention will be clearly understood in connection with the accompanying drawings, in which.

DETAILED DESCRIPTION

Figure 3:
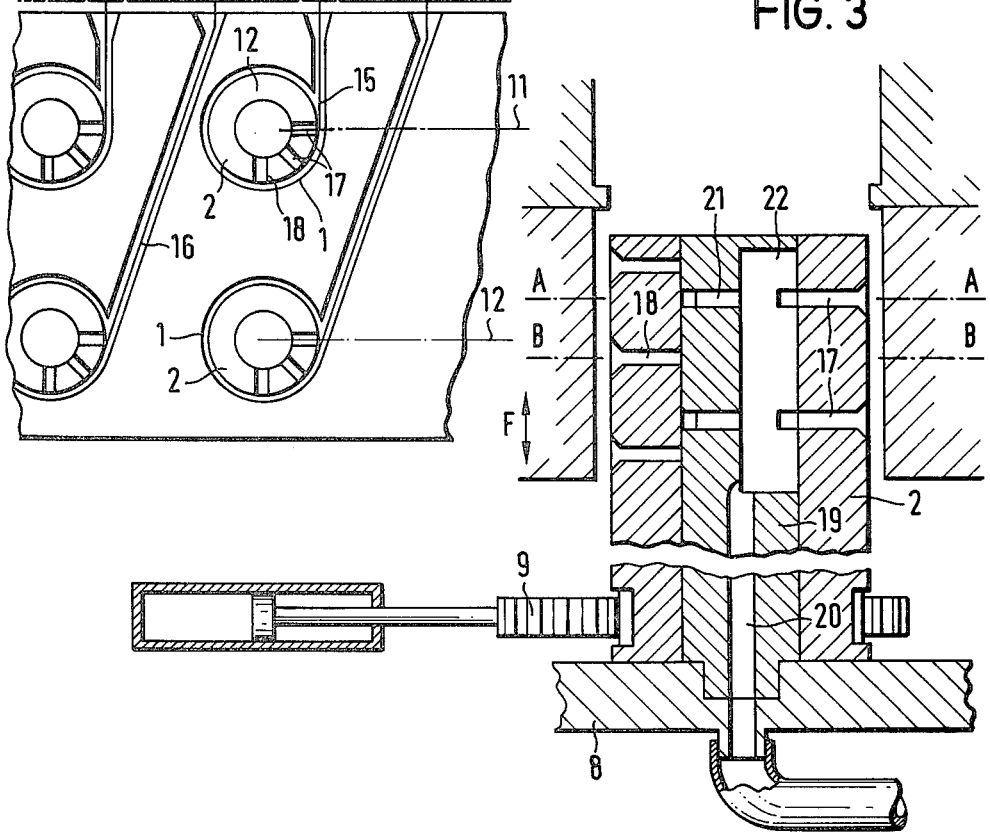
FIG. 3 is a schematic sectional axial view of a mandrel of a member having guide passages of the type illustrated in FIG. 1 along line C—C of FIG. 4.
Figure 4:
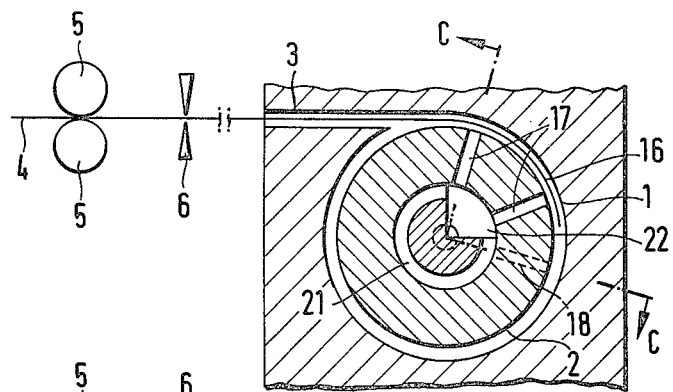
FIGS. 4 and 5 are sectional views, respectively, along lines A—A and B—B of FIG. 3.
Figure 5:
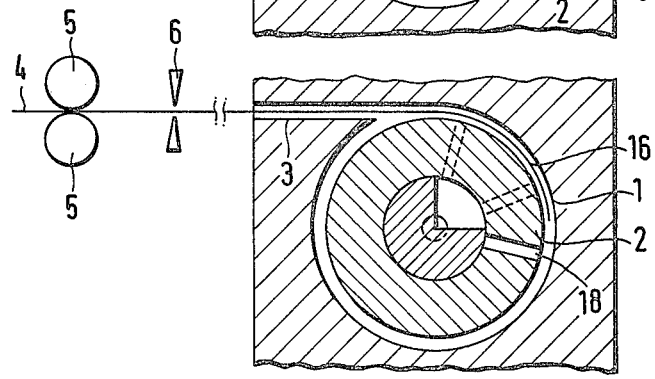

By reviewing the attached drawings and in particular FIGS. 3 to 5 thereof, it can be noted that the arrangement is similar to the arrangement of German Pat. No. 568,834 in which the looping about itself of a banderole or strip, its transverse cutting and its introduction into a receptacle are effected by means of members 1, having guide passages which are associated with rotating guiding mandrels 2 which are slidably axially mounted with respect to the members 1. The members 1 are provided with inlet slits 3 through which the banderoles or strips 4 are introduced by virtue of the action of the rollers 5 and the strips or banderoles 4 are thereby looped around the mandrel 2; after being cut by the knife 6, the looping is terminating by the mandrels 2 which then transfer the looped banderoles 16 into a receptacle which may be, for example, the molds 7 associated with the members 1 as is disclosed in French Pat. No. 2.256.013 and 2.340.185 cited hereinbefore.

In the illustrated example, the mandrels are rotatably mounted on a plate 8 by means of the gear wheel and gear rack arrangement 9, 10 and the assembly of member 1, molds 7 is axially slidable with respect to the mandrel 2 along the double arrows F between a high position in which the active part of the mandrel 2 is disposed in the member 1, (FIG. 3) and a low position (not illustrated) in which the active part of the mandrel 2 is disposed in the mold 7.

In accordance with the invention, the members 1 having guide passages for looping are disposed along two lines 11, 12 and are supplied with mandrels 2 from the same side; the knives 6 being disposed along two parallel lines, 13, 14, in staggered arrangement with respect to each other; the distance between the cutting edge or ridge of one knife 6 and the inlet generatrix 15 of the member 1 having the corresponding guide passage being slightly less than the length of one cut banderole 16 and the mandrel 2 including two suction zones; the first zone 17 outletting in the portion of the mandrel 2 which faces the front end of the cut banderole 16 which has been introduced into the member 1 at the moment of the operation of the knife 6 and is coupled with a source of vacuum during the rotation of the mandrel 2 after the action of the knives 6 until looping of the banderole is complete; whereas during the transfer into the mold 7, the second zone 18 outletting into the portion of the mandrel 2 facing the other end of the banderole 16 at the end of the looping of the banderole by rotation of the mandrel is coupled with the source of vacuum only at the end of such rotation and during the transfer.

Figure 1:
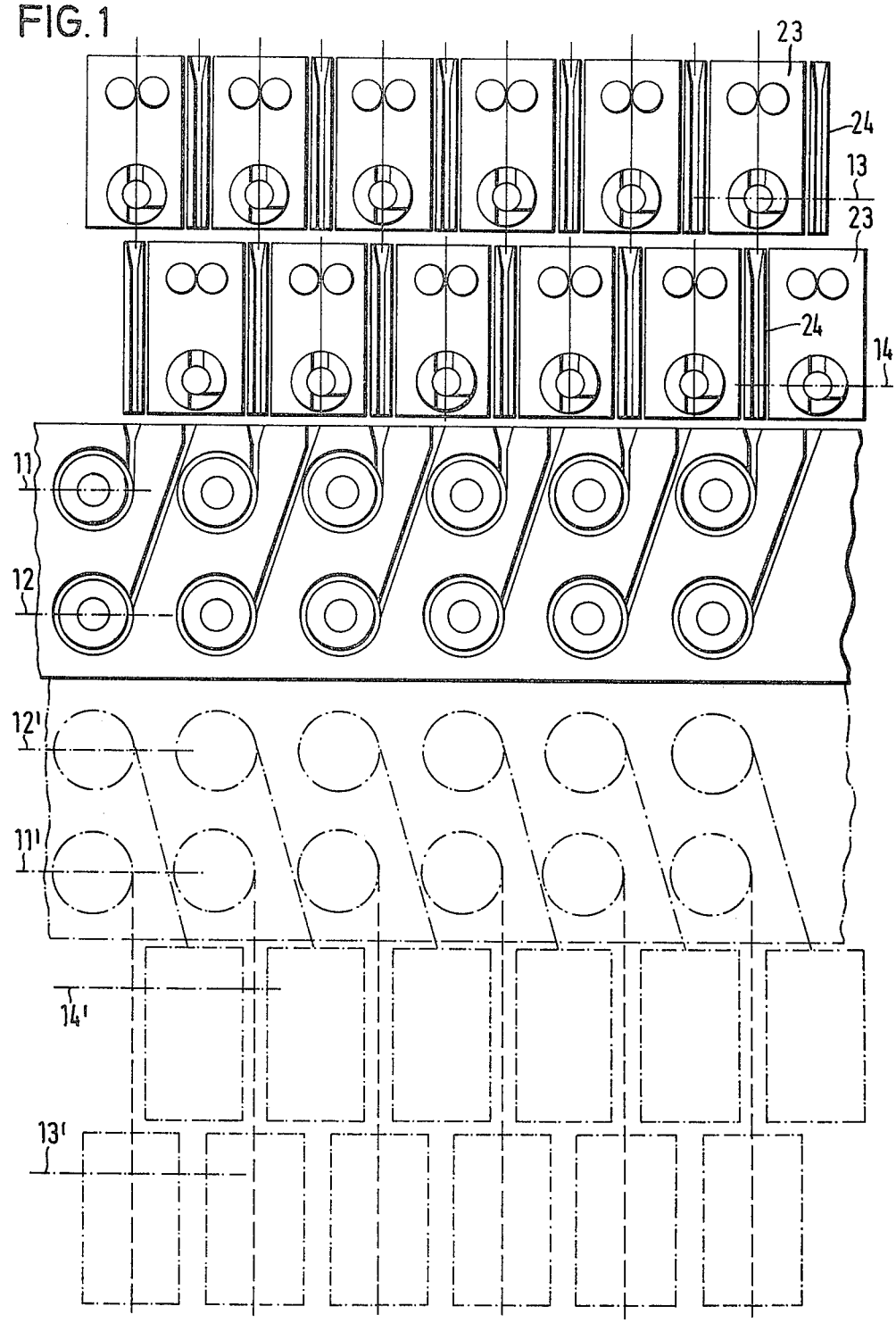
FIG. 1 is a schematic diagram in plan view of the arrangement of the invention.

By disposing symmetrically another group of two parallel lines 11', 12', as is illustrated in dash-dot lines in FIG. 1, it is possible to obtain simultaneous feeding of twenty-four members with guide passages and twenty-four molds instead of the twelve as described previously, that is to say the production of the machine can be doubled without excessive mechanical complications since the arrangement of the invention permits the simultaneous and synchronous functioning of all the rollers 5, knives 6, and mandrels 2 and molds 7, which is very important.

MANNER OF OPERATION

Figure 6:
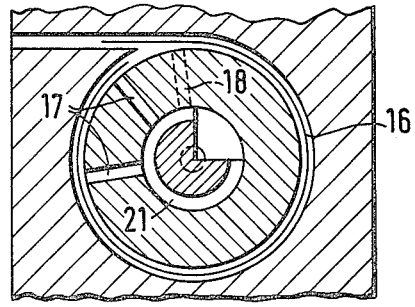
FIGS. 6 and 7 are analogous view to the view of FIG. 4, illustrating the functioning of the arrangement of the invention.

The banderoles are, during a first stage, paid out by the rollers 5 until the cutting position is reached and the knives 6 separate the banderoles into cut banderoles 16. In this position the front ends of all the banderoles 16 have penetrated into the guide passage of the members 1 as a result of the fact that the distance between the knives 6 and the inlet generatrix 15 is slightly less than the length of one banderole 16 in its cut state. Each mandrel 2 has a first suction zone 17 which confronts one end of the cut banderole 16 so introduced, which end is thereafter sucked against the surface of the mandrel 2 (FIG. 4), which thereafter is placed in rotation and loops the banderole 16 around itself. At that stage (FIG. 5), the second suction zone 18 is not coupled or connected to a source of vacuum. At the end of the looping process (FIG. 6), the suction zone 18 is now placed in communication with a source of vacuum at the moment where the suction zone is covered by the other end of the banderole 16. The two ends of the cut banderoles 16 are thereby held by the mandrel 2; the banderole now overlays the mandrel 2 about its entire periphery and may be transferred without risk or being displaced or other malfunctioning incidents.

For the good functioning of the arrangement of the invention, it is necessary that the suction zones 17 and 18 cover a length of banderole which is sufficient to permit the complete suction action of the suction passages which means that the suction zones 17 and 18 cover a banderole length of several millimeters or about 1 cm. Nevertheless, as is illustrated, these zones may be more extended; in particular the zone 17 may cover up to $\frac{1}{4}$ of the periphery of the mandrel; it is, therefore, possible to place several suction passages 17 on the mandrel which assures a better entrainment of the banderole 16 during the rotation of the mandrel 2.

Similarly, the zone 18 may outlet into the portion of the mandrel which is occupied by the last fourth of the length of the banderole in order to assure a good retention of the rear end of the banderole 16.

Figure 7:
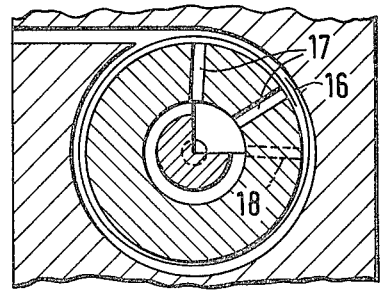

Once the banderole 16 has been completely looped about the mandrel, the latter may effect a complete rotation at the moment when the suction zone 18 is no longer coupled or in communication with a source of vacuum (FIG. 7).

In the illustrated embodiment, the mandrel 2 is constructed as a sleeve which turns about a fixed shaft 19 through which there is coupled a source of vacuum by an internal conduit 20; the mandrel is provided with passages in zones 17 and 18. With respect to the suction passages in the zone 17, the shaft 19 has grooves 21 which are in communication with the conduit 20; with respect to the passages in the sections in zone 18, the shaft 19 has cutout sections 22 which are in communication with the conduit 20.

Preferably the distance between the cutting ridge or edge of the knives 6 and the inlet generatrix 15 of the members 1 having the guide passages, is the same for the members disposed on the lines 11 and 12; thereby by placing each banderole 16 in operation and by cutting it, the short ends of the banderole penetrate the same distance into all of the members 1 and the banderoles 16 may be disposed and mounted identically in each one of the members 1.

In case this condition is not maintained, there simply results an overlap of the ends of the banderoles in the two lines, which overlap may actually be a desired object and result to be achieved in certain cases.

Such overlap may also be obtained by differently rotating the mandrels 2 of lines 11 and 12, that is, either their velocity or the time of rotation may be different. The limits imposed on the adjustment of rotation of the different mandrels 2 in lines 11 and 12 are controlled by the necessity of maintaining the communication with the source of vacuum in the zone 18 until the end of the operative stroke.

If one desires to place the ends of the banderoles in predetermined positions, and eventually in different positions for lines 11 and 12, the invention provides that the shafts 19 are entrained by the mandrels 2 during the end of their stroke of rotation in such a way as to maintain the coupling of the zone 18 until the mandrels 2 have attained the desired position, means for repositioning the shaft 19 into its starting position being provided.

Figure 2:
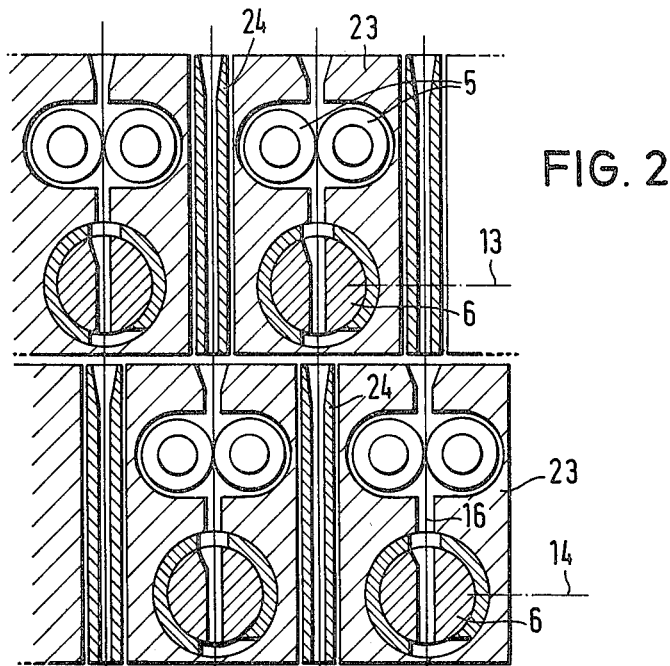
FIG. 2 is a plan view, at a larger scale than FIG. 1, of a detail of the arrangement of FIG. 1.

As is illustrated in FIGS. 1 and 2, at each cutting knife 6 there is associated a pair of feed rollers 5 which feed rollers and cutting knife are mounted into a compact block 23; the different blocks 23 being disposed at the same side of lines 11 and 12 along two lines of blocks which are staggered with respect to each other and which are separated by guide passages 24 of lengths equal to those of the blocks 23. By means of such an arrangement a simple mechanical operation is obtained whereby an easy access to the members can be had by the way the blocks 23 and channel 24 are mounted and disposed along independent lines which are staggered with respect to each other.

One of the advantages of the invention resides in the functioning of the blocks for cutting and the mandrels being such as to be susceptible to synchronization; it being possible to feed the members 1 from one single feed roller from which separate bands can be fed.

As has been mentioned hereinabove, the arrangements of the inventions can be adapted to all types of machines in which it is necessary to depose banderoles into any kind of receptacles.

Although the invention is illustrated and described with reference to a plurality of embodiments thereof, it is to be expressly understood that it is in no way limited to the disclosure of such preferred embodiments but is capable of numerous modifications within the scope of the appended claims.

I claim:

1. An improved arrangement for introducing banderoles into receptacles wherein the banderoles 16 are fed into guide passages 1 in which suction mandrels 2 are disposed for looping the banderoles 16, each guide passage 1 having an inlet slit 3 through which the banderole 16 is cut and introduced by the action of a pair of feed rollers 5 and a transverse cutting knife 6, the looped banderole 16 being thereafter transferred to a mold 7 by the mandrel 2, the improvement comprising, the guide passages 1 are disposed in a plurality of members which are disposed along two parallel lines 11, 12 and are fed with cut banderoles 16 from the same side;

the knives 6 are also disposed along two parallel lines 13, 14 in staggered relationship;

the distance between the cutting edge of a knife 6 and the inlet generatrix of a guide passage 1 is slightly less than the length of a cut banderole 16; and the suction mandrel 2 having two suction zones, the first zone 17 outletting into that portion of the suction mandrel 2 which confronts the front end of the banderole 16 which is introduced into the guide passage 1 at the moment the banderole 16 is cut by the knife 6, and which is coupled to a source of vacuum during the rotating of the mandrel 2 subsequent to the actuation of the knife 6 until complete looping of the banderole, as well as during the transfer to the mold 7, the second zone 18 outletting into that portion of the suction mandrel 2 which confronts the rear end of the cut banderole 16 at the end of looping thereof by the rotating mandrel 2, which second zone 18 is coupled to the source of vacuum only at the end of rotation of the mandrel 2 and during transfer of the banderole 16 to the mold 7.

2. The improved arrangement for introducing banderoles into receptacles as set forth in claim 1, wherein the difference in length between the length of one cut banderole 16 and the distance which separates the cutting edge of knife 6 and the inlet generatrix 15 is greater than 1 cm and less than about one fourth of the periphery of the suction mandrel 2.

3. The improved arrangement for introducing banderoles into receptacles as set forth in claim 2, wherein the distance between the cutting edge of the knife 6 and the inlet generatrix 15 of the guide passage 1 is the same for all members with guide passages in lines 11 and 12.

4. The improved arrangement for introducing banderoles into receptacles as set forth in claim 3, wherein the second zone 18 is outletting into that portion of the mandrel 2 which is occupied by the last quarter of the looped cut banderole 16.

5. The improved arrangement for introducing banderoles into receptacles as set forth in claim 4, wherein said plurality of members are disposed along two parallel lines, each knife 6 being operatively connected to a pair of feed rollers 5, said knife 6 and pair of feed rollers 5 being operatively mounted in a compact introducing and cutting block 23, the blocks 23 being disposed along two parallel lines 13, 14 at the same side of the plurality of members in staggered relationship to each other, the adjoining blocks in each line 13, 14 being separated from each other by guide passages 24.

6. The improved arrangement for introducing banderoles into receptacles as set forth in claim 5, wherein each suction mandrel 2 is formed by a sleeve having a plurality of passages, which sleeve is rotatable on a fixed shaft 19 having annular grooves 21 which serve as conduits for the first suction zone 17, and having cutout sections 22, which serve as conduits for the second suction zone 18, said cutout sections 22 and annular grooves 21 being coupled to a source of vacuum.

7. The improved arrangement for introducing banderoles into receptacles as set forth in claim 6, wherein the drives for rotating the mandrels 2 of line 11 and 12 differ from each other.

8. The improved arrangement for introducing banderoles into receptacles as set forth in claim 7, wherein the shaft 19 on which the sleeve rotates can itself be rotated so as to reposition the mandrel 2 into its starting position.

* * * * *